April 26, 1949.
W. A. SCHULTZ
2,468,118
LIQUID LEVEL RESPONSIVE HYDRODYNAMIC
FLOW CONTROL
Filed Oct. 25, 1946
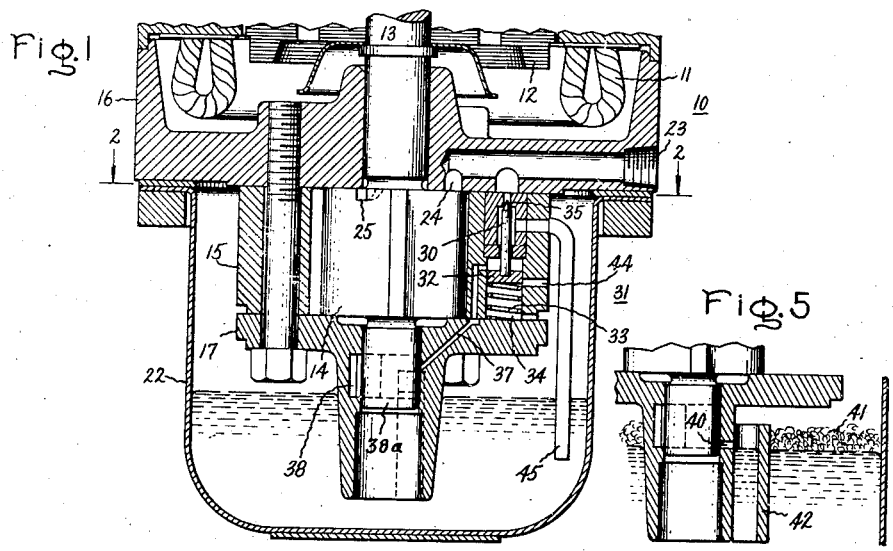
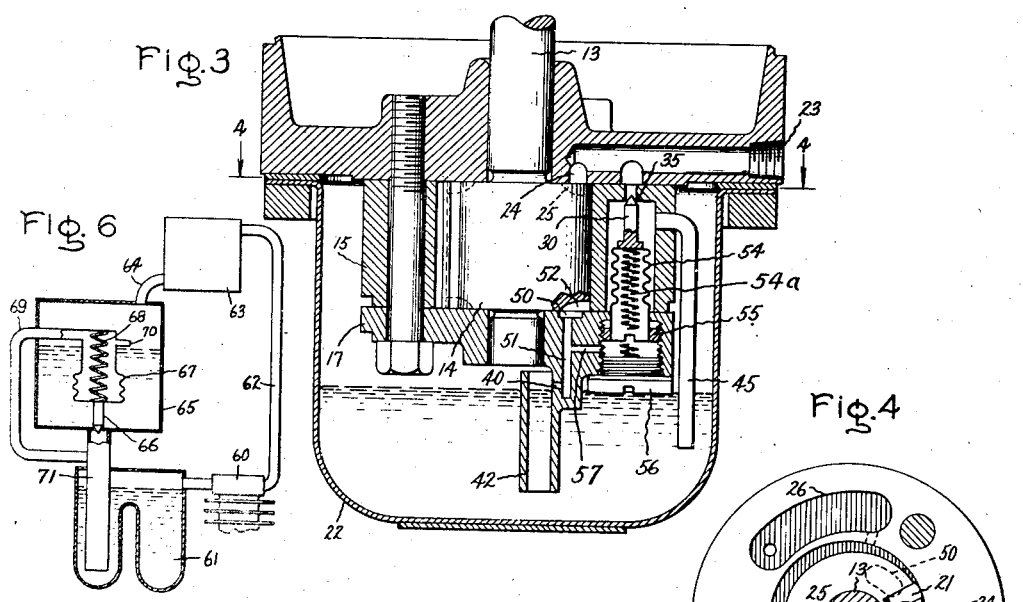
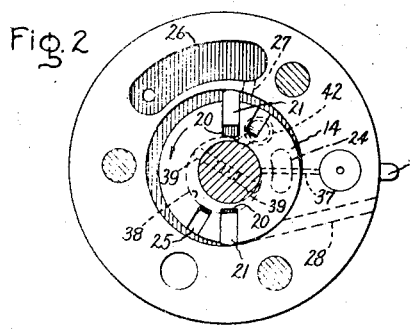
Inventor:
Wilbur A. Schultz,
by Edwin L. Rich
His Attorney.

Patented Apr. 26, 1949

2,468,118

UNITED STATES PATENT OFFICE 2,468,118

LIQUID LEVEL RESPONSIVE HYDRO-DYNAMIC FLOW CONTROL

Wilbur A. Schultz, Lakewood, Ohio, assignor to General Electric Company, a corporation of New York Application October 25, 1946, Serial No. 705,536

13 Claims. (Cl. 103—40)

The invention relates to automatic liquid level control and provides improved hydrodynamic flow control mechanism suitable for oil burner or other pumping control services where a predetermined liquid level is to be maintained.

The liquid level in any flow chamber or reservoir either rises or falls when the inlet flow rate exceeds or falls below the outlet flow rate. Ordinarily some suitable form of automatic float operated flow control mechanism is provided for controlling either the inlet or outlet flow rate to maintain the desired liquid level.

The principal object of the present invention is to provide a floatless form of liquid level responsive control by locating the inlet of an improved hydrodynamically operated flow control mechanism at the desired liquid level so as to selectively control in response to the flow of either liquid or gas through said inlet.

Another object is to provide a complementary flow rate control wherein one variable liquid flow rate is dependent upon a secondary variable liquid or gas flow rate and said secondary flow rate in turn is determined selectively by the level of the liquid flowing at said one variable rate.

Another object is to provide a main flow rate control hydrodynamic mechanism having a secondary flow inlet located at a predetermined level for the main liquid flow and capable of inversely varying the main flow rate dependent upon whether the liquid rises above or falls below the secondary flow inlet.

Another object is to provide a main pump for pumping liquid into a container with control means including auxiliary pumping means having an inlet effective when the liquid level rises above a predetermined level in the container for thereupon pumping the liquid to hydrodynamic means for decreasing the output of the main pump and vice versa.

Another object is to combine the main pump with a coaxial jointly operable auxiliary pump and associated hydrostatic control mechanism for varying the rate of the main pump selectively dependent upon whether the auxiliary pump is pumping a liquid or a gas.

A further object is to provide a rotary blade main pump with an auxiliary pumping inlet and associated hydrodynamic pumping rate control mechanism such as to enable the rotary blade pump to automatically maintain a predetermined liquid level.

Further objects and advantages of the invention will appear in the following description of the accompanying drawings in which Fig. 1 is a sectional view of an electric driven oil burner pumping mechanism provided with the improved liquid level responsive hydrodynamic pumping control of the present invention. Fig. 2 is a sectional view of the rotary blade pump mechanism shown in Fig. 1 looking in the direction of the arrows 2—2; Fig. 3 is a sectional view of the pumping mechanism provided with a modified form of liquid level responsive hydrodynamic control of the present invention; Fig. 4 is a sectional view of the pumping mechanism shown in Fig. 3 looking in the direction of arrows 4—4; Fig. 5 is a partial sectional view of the shielded auxiliary pump inlet structure of Fig. 1 showing more clearly the details of construction; and Fig. 6 illustrates schematically a refrigerant pumping system embodying the invention.

Referring to Fig. 1, the rotary piston pumping mechanism indicated generally by the reference character 10 is of the type adapted to supply oil and air under pressure to an oil burner atomizing nozzle as more fully described and claimed in the Lum Patent 2,032,291.

Only a portion of the electric motor for driving the combined oil and air pumping mechanism 10 is illustrated in Fig. 1, namely the electric motor stator coils 11, the motor rotor 12 mounted on shaft 13, that carries the main pump rotor 14, eccentrically within the cylinder body 15 between the upper end plate 16 and the lower end plate 17. As shown in Fig. 2 the pump rotor 14 is provided with the opposed slots 20 carrying the cylinder sealing blades 21 therein. As more fully described in the above mentioned Lum patent the upper and lower end plates 16 and 17 are provided with suitable oil and air inlet and outlet passages communicating with the space inside of the cylinder body 15 so that both oil and air are pumped under pressure into the pressure sump or reservoir 22 to be supplied therefrom to an atomizing burner nozzle not shown.

As shown in Fig. 1 the oil inlet passage 23 is formed in the upper end plate 16 with the port 24 located adjacent the path of oil inlet groove 25 formed radially in the top face of the pump rotor 14 so as to connect the oil inlet passage 23 with the vacuum space behind the blades 21 as long as each of the grooves 25 registers with the port 24. Thus upon rotation of the rotor 14 in a counterclockwise direction as indicated by the arrow in Fig. 2 the pump 10 exerts a suction on the oil inlet passage 23 so as to pump oil from a main storage reservoir (not shown) into the pressure sump 22. Likewise, air is pumped from the air inlet surge chamber 26 shown in Fig. 2 through the lateral air inlet port 27 into the space behind the blades 21 and both oil and air under pressure are discharged from the pump cylinder through the outlet passage 28 into the sump 22.

In order to maintain a predetermined oil level inside the sump 22, the by-pass valve 30 is provided for controlling the suction on the oil inlet passage 23 so as to thereby vary the oil pumping rate. In carrying the present invention in effect as shown in Fig. 1 the oil by-pass valve 30 is operated by an improved hydrodynamic mechanism indicated generally by the reference character 21.

In the form shown in Fig. 1, the valve 30 is operated by a piston 32 that is biased by spring 33 to move upwardly inside the cylinder 34 to close valve 30 on its seat 35. The space in cylinder 34 above piston 32 communicates through passage 37 with an auxiliary pump 38 that is coaxial with the main pump rotor 14 and is jointly operated by the pump driving rotor 12. As shown in Figs. 1 and 2 the auxiliary pump cylinder 38 is formed in the lower end plate 17 and provided with a pair of opposing sealing blades 39 for supplying liquid under pressure through passage 37 to operate piston 32 against the bias of spring 33. The inlet 40 into the auxiliary pump cylinder 38 is located at the predetermined level of the liquid to be maintained in sump 22 upon operation of the main pump rotor 14. As more clearly shown in Fig. 5 in order to shield the auxiliary pump inlet 40 from the foam or froth 41 which may be carried in the surface of the oil in the sump 22, the baffle 42 is provided so that oil unmixed with air is supplied from the bottom of the sump 22 to the auxiliary pump inlet 40.

*Operation of Fig. 1*

When the oil pumping mechanism 10 is started into operation upon energization of the motor stator windings 11, motor rotor 12 drives both the main pump rotor 14 and the auxiliary pump rotor 38a. However, the auxiliary pump 38 is relatively ineffective as long as air is being pumped through the inlet 40. Hence there is not sufficient air pressure produced to operate piston 32, since the air quickly leaks around the loose fitting stem of valve 30 and thus bleeds away the pressure from piston 32. Consequently valve 30 remains closed. Thus the rotation of the main pump rotor 14 produces a relatively strong suction that draws oil through the oil inlet passage 23 into cylinder 15. The oil along with air under pressure is discharged into the sump 22. But when the oil in sump 22 rises above the level of the auxiliary pump inlet 40, then an increasing amount of oil is pumped by the auxiliary pump 38 through passage 37 to operate piston 32 against the bias of spring 33 and thereby open the by-pass valve 30 even though some of the oil bleeds around the stem of valve 30. In case the oil level still continues to rise then piston 32 will move downwardly until the increased volume of oil pumped by the auxiliary pump discharges through the outlet passage 44. As soon as valve 30 opens oil is supplied from sump 22 through the valve port 35 to the oil inlet passage 23 since the oil in sump 22 is maintained under a substantial pressure. As a result, oil drawn from the main reservoir (not shown) is reduced in quantity and the oil level in sump 22 will fall until just enough oil is being pumped by the auxiliary pump 38 to balance the bleed loss around valve stem 30 and thus maintain the valve 30 open sufficiently to hold a predetermined oil level in sump 22 as determined by the location of the inlet port 40 of the auxiliary pump. Then in case the oil level in sump 22 falls slightly, the bleed loss will exceed the auxiliary oil pumping rate and the valve 30 will tend to close and thus increase the pumping rate of the main pump 14 to supply more oil to the sump 22. On the other hand, when the oil level rises slightly in sump 22, more oil will be pumped by the auxiliary pump 38 than is bled away so as to move piston 32 and increase the opening of valve 30 thereby regulating the suction of the main pump 14 so as to decrease the oil pumping rate thereof. When the oil level in sump 22 falls below the auxiliary pump inlet 40, then the auxiliary pump 38 can only pump air and due to the substantial clearances around the stem of valve 30, the air pressure leaks away so that piston 32 is not operated against the bias of spring 33. Hence valve 30 will close and remain closed until the oil level in sump 22 again rises up to the pump inlet 40.

While pipe 45 has been shown extending into the oil at the bottom of sump 22, it will be understood that this pipe may be eliminated if desired and air supplied from the top of the sump 22 through valve port 35 so as to break or decrease the vacuum exerted on the oil inlet passage 23 and thereby decrease the main oil pumping rate. Otherwise the operation is substantially the same.

In the modified form of hydrodynamic liquid level pumping control shown in Fig. 3, the main pump rotor 14 is able to perform the auxiliary liquid level responsive pumping function in addition to its normal function of pumping oil and air into the sump 22. This may be accomplished as shown in Figs. 3 and 4 by providing the port 50 in the lower end plate 17 with this port 50 communicating through passage 51 with the liquid level responsive inlet 40 located at the predetermined oil level that is to be maintanied inside of sump 22. The arrangement is such that port 50 communicates with each slot 52 formed in the bottom face of the main pump rotor 14 immediately after the slot 25 formed in the upper face breaks communication with oil inlet port 24. In this way the passage 51 is brought into communication with the suction space back of each blade 21 as long as slot 52 commnunicates with port 50, thus creating a pumping suction on passage 51. Preferably the slots 25 and 52 in the opposite end faces of rotor 14 are aligned directly opposite each other and the ports 24 and 50 are angularly displaced as indicated in Fig. 4. However, to more clearly disclose the port construction details Fig. 3 is somewhat distorted in indicating ports 24 and 50 as in the same cross-sectional plane. However, if such aligned port construction is desired then the slots 25 and 52 may be angularly displaced to produce the sequential communication with the corresponding ports as outlined above.

The pressure responsive bellows 54 is provided for operating the by-pass valve 30 and is normally biased by spring 54a to close valve 30 on its port 35. The bellows 54 is carried by the threaded mounting member 55 and the threaded plug 56 is provided for closing off the interior of bellows 54 so that the inside of bellows 55 may be subject by means of the passage 57 to the suction existing in passage 51.

*Operation of Fig. 3*

When the pump shown in Fig. 3 is operating, oil is pumped through oil inlet 23 and discharged into the sump 22 in the manner previously indicated. When the oil rises to the level of the inlet 40, then the suction in the passage 51 is increased sufficiently to cause bellows 54 to collapse sufficiently to open valve 30. As a result oil passes from sump 22 through pipe 45 directly into the oil inlet 23 and in this way the oil level in sump 22 is prevented from rising above the inlet 40. When the oil level falls below inlet 40, then the suction in passage 51 decreases and bellows 54 will return valve 30 to the closed position thereby increasing the suction in the oil inlet passage 23 and correspondingly increasing the supply of oil to the sump 22. When the oil level partially covers the port 40, then a variable mixture of air and oil will be pumped through passage 51 thereby creating a variable suction on bellows 54 to variably open valve 30. In this way, the oil pumping rate into sump 22 may be modulated so as to maintain the oil level in the sump substantially constant even though the outlet flow rate to the burner atomizing nozzle may be varied considerably.

As previously indicated, pipe 45 may be omitted and air admitted by valve 30 to partially break the vacuum of the oil inlet 23 if desired. Thus it will be seen that by means of the present invention, the float for operating the pumping rate control valve mechanism can be eliminated and the pumping rate controlled by a more reliable and efficient hydrodynamic mechanism either of the piston type as shown in Fig. 1 or of the bellows type as shown in Fig. 3.

In the refrigerant pumping system shown in Fig. 6, the compresser 60 is connected to pump gas from the evaporator 61 and supply the compressed gas through conduit 62 to the condenser 63. The liquified refrigerant drains from condenser 63 through conduit 64 into the liquid reservoir 65. The valve 66 is provided for regulating the flow of liquid refrigerant from reservoir 65 through conduit 71 into the evaporator 61.

In order to operate valve 66 so as to maintain a predetermined liquid level in reservoir 65 in accordance with the present invention, the bellows 67 is operatively connected with valve 66 and provided with the spring 68 for biasing valve 66 to the closed position. The bellows 67 is interconnected by means of the conduit 69 with the outlet conduit 71 and the bellows 67 is provided with a flow metering orifice 70 located at the desired liquid level inside of the reservoir 65. Preferably conduit 69 offers resistance to fluid flow substantially equal to the resistance offered by metering orifice 70.

*Operation of Fig. 6*

Upon operation of the compressor 60 suction is applied to the evaporator 61 and thence through conduit 71 and 69 to the inside of bellows 67. Thus suction is exerted upon the flow metering orifice 70. As long as only gas flows through orifice 70, then the reduction of pressure inside of bellows 67 is insufficient to overcome the bias of spring 68 and open valve 66. However, when the liquid level inside reservoir 65 rises so that liquid reaches the flow metering orifice 70, then sufficient reduction of pressure inside of bellows 67 is obtained to contract the bellows 67 and thereby open valve 66. Upon the resulting decrease in liquid level within the reservoir 65, then the pressure inside bellows 67 will again increase to close valve 66. In this way valve 66 is positioned by the operation of bellows 67 so as to maintain the liquid level inside of reservoir 65 substantially at the predetermined level at which metering orifice 70 is located.

What I claim as new and desired to secure by Letters Patent of the United States is:

1. A liquid level control system having in combination means including a movable element for regulating the liquid level, fluid flow producing means having a flow passage provided with an inlet opening at a predetermined desired level for the liquid, and means dependent upon the admission of gas and liquid to said passage for selectively operating said element when the liquid rises above and falls below said inlet opening.

2. A liquid level control system having in combination plural means for producing flow, one having a flow inlet for providing a flow rate dependent upon variations in the level of the liquid flow produced by the other, and means responsive to the flow rate of said one means for regulating the liquid flow rate of said other means selectively to counteract said variations.

3. In combination, a container for liquid, means including a valve for regulating the liquid level in said container, fluid flow producing means having a flow passage provided with an inlet opening at a predetermined desired level for the liquid, and pressure responsive means responsive to the pressure variations produced upon admission of gas and liquid to said passage for reversely operating said valve when the liquid rises above and falls below said inlet opening.

4. In combination, a container for liquid having means including a valve for regulating the liquid level therein, fluid flow producing means having a flow passage with a flow inlet opening at a predetermined level inside said container and means responsive selectively to the admission of gas and liquid to said passage for reversely operating said valve to maintain the liquid in said container substantially at said predetermined level.

5. In combination a container for liquid, means including a pressure responsive device and a flow regulating valve actuated by said device for varying the liquid level in said container, and suction means interconnected with said device and having an inlet disposed at a predetermined level in said container for reversely varying the pressure of said pressure responsive device when the liquid rises above and falls below said inlet.

6. In combination, a container having liquid supply means including a pump, means including a valve for controlling the operation of said pump to vary the liquid level in said container, and means including a suction inlet for said pump disposed at a predetermined level in said container and pressure responsive means responsive to the pressure variation produced upon admission of gas and liquid into said inlet for reversely operating said valve.

7. In combination a pump having a pressure responsive by-pass valve for varying the pumping rate thereof, and means including an auxiliary pump having an inlet disposed at a predetermined liquid level for supplying liquid under pressure to operate said by-pass valve when the liquid rises above said level.

8. In combination a rotary blade pump having a by-pass valve for varying the liquid pumping rate thereof, a pressure responsive device operatively connected with said valve, and means including an auxiliary rotary blade pump coaxial with said main pump and driven thereby and having an inlet located at a predetermined liquid level for varying the pressure of said device to operate said valve to reversely vary the pumping rate of said pump when the liquid rises above and falls below said inlet.

9. An oil burner mechanism having in combination, a pressure sump having pumping means for supplying oil and air under pressure thereto, and hydrodynamic means including a suction inlet for said pumping means located in said container at a predetermined oil level and a pressure responsive by-pass valve responsive differentially to air and oil flow through said inlet for regulating the oil pumping rate of said pumping means to maintain said predetermined oil level in said sump.

10. An oil burner mechanism having in combination a pressure sump, a rotary pump provided with one inlet for pumping oil and another inlet for pumping air under pressure into said sump, said pump having a third inlet communicating with said sump at a predetermined level for the oil therein, and means including a pressure responsive by-pass valve responsive differentially to air and oil flow through said third inlet for regulating the suction at said one oil inlet to maintain said predetermined oil level in said sump.

11. A liquid level control mechanism having in combination a container for retaining a body of liquid at a predetermined desired level, means having an inlet opening at said level for withdrawing fluid from said container, control means responsive differentially to the admission of gaseous and liquid fluid to said opening, means having an inlet below said level for withdrawing liquid from said body, and flow regulating means controlled by said control means for increasing the rate of flow of liquid through said liquid withdrawing means upon the admission of liquid to said first-mentioned inlet opening and for decreasing the rate of flow upon the admission of gaseous fluid to said first opening.

12. In combination, a fluid container, means including a pump for supplying fluid under pressure to said container, means including a valve for admitting to said pump fluid from said container, means for controlling said valve to maintain a predetermined desired liquid level in said container, said control means comprising a pumping device having an inlet opening in said container at said desired level and being arranged to open and close said valve upon the admission of liquid and gaseous fluid respectively to said inlet opening.

13. In combination, a fluid container, means including a pump for supplying fluid under pressure to said container, means including a valve for admitting to said pump fluid from said container, means for controlling said valve to maintain a predetermined desired liquid level in said container, said control means having an inlet opening at said liquid level for withdrawing liquid and gaseous fluid from said container and being responsive differentially to the admission of gaseous and liquid fluid to said opening to operate said valve and to reversely vary the pumping rate of said pump when the liquid rises above and falls below said inlet opening.

WILBUR A. SCHULTZ.

REFERENCES CITED

The following references are of record in the file of this patent:

UNITED STATES PATENTS

| Number | Name | Date |
|---|---|---|
| 683,630 | Westinghouse | Oct. 1, 1901 |
| 688,286 | Blevney | Dec. 10, 1901 |
| 1,530,066 | Wood | Mar. 17, 1925 |
| 1,914,541 | Teesdake | June 20, 1933 |